United States Patent
Wu et al.

(10) Patent No.: US 9,612,479 B2
(45) Date of Patent: Apr. 4, 2017

(54) PIXEL STRUCTURE AND ARRAY SUBSTRATE

(71) Applicant: Chunghwa Picture Tubes, Ltd., Taoyuan (TW)

(72) Inventors: Hung-Yu Wu, New Taipei (TW); Hsin-Min Fu, Taoyuan (TW); Jan-Tian Lian, Keelung (TW)

(73) Assignee: Chunghwa Picture Tubes, Ltd., Taoyuan (TW)

(*) Notice: Subject to any disclaimer, the term of this patent is extended or adjusted under 35 U.S.C. 154(b) by 0 days.

(21) Appl. No.: 14/956,396

(22) Filed: Dec. 2, 2015

(65) Prior Publication Data
US 2016/0091761 A1 Mar. 31, 2016

Related U.S. Application Data

(62) Division of application No. 13/794,828, filed on Mar. 12, 2013.

(30) Foreign Application Priority Data

May 9, 2012 (TW) .............................. 101116499 A (51) Int. Cl.
*G02F 1/1343* (2006.01)
*G02F 1/1337* (2006.01)

(52) U.S. Cl.
CPC .. *G02F 1/133707* (2013.01); *G02F 1/133753* (2013.01); *G02F 1/134309* (2013.01); *G02F 1/134363* (2013.01); *G02F 2001/133757* (2013.01)

(58) Field of Classification Search
CPC ......... G02F 1/133707; G02F 1/134363; G02F 1/134309; G02F 1/133753
See application file for complete search history.

(56) References Cited

U.S. PATENT DOCUMENTS

| 37,686 A | 2/1863 | Goldthwait |
| 85,524 A | 1/1869 | Hall |
| 6,466,288 B1 | 10/2002 | Rho |
| 7,625,611 B2 | 12/2009 | Kim |
| 7,718,234 B2 | 5/2010 | Tomioka |

(Continued)

FOREIGN PATENT DOCUMENTS

| CN | 102176092 A | 9/2011 |
| CN | 202049313 | 11/2011 |

(Continued)

*Primary Examiner* — Edward Glick
*Assistant Examiner* — Anthony G Quash
(74) *Attorney, Agent, or Firm* — Winston Hsu; Scott Margo (57) ABSTRACT

The present invention provides a pixel structure disposed on a substrate, and the pixel structure includes an alignment layer, a common electrode, and a pixel electrode. The alignment layer is disposed on the substrate, and the alignment layer has a first section and a second section. The first section has a first alignment direction, and the second section has a second alignment direction perpendicular to the first alignment direction. The common electrode is disposed between the substrate and the alignment layer, and the pixel electrode is disposed between the substrate and the alignment layer.

8 Claims, 10 Drawing Sheets

(56) References Cited

U.S. PATENT DOCUMENTS

| | | | |
|---|---|---|---|
| 7,872,718 B2 | 1/2011 | Inoue | |
| 7,995,177 B2 | 8/2011 | Shoraku | |
| 9,134,580 B2 | 9/2015 | Nishida | |
| 2006/0061719 A1 | 3/2006 | Tomioka | |
| 2007/0024789 A1 | 2/2007 | Itou | |
| 2009/0213307 A1 | 8/2009 | Chiu | |
| 2009/0244467 A1* | 10/2009 | Nomura | G02F 1/134363 349/141 |
| 2010/0026948 A1* | 2/2010 | Wang | G02F 1/1337 349/129 |
| 2012/0075562 A1 | 3/2012 | Yeh | |
| 2012/0081626 A1* | 4/2012 | Itoh | G02F 1/136259 349/33 |
| 2012/0133872 A1* | 5/2012 | Kim | G02F 1/133707 349/128 |
| 2012/0262656 A1 | 10/2012 | Kaneko | |

FOREIGN PATENT DOCUMENTS

| | | | | |
|---|---|---|---|---|
| CN | 202049313 U | * | 11/2011 | G02F 1/1343 |
| JP | 2009025639 A | | 2/2009 | |
| TW | 200424640 | | 11/2004 | |
| TW | 200726828 | | 7/2007 | |
| TW | 200937075 | | 9/2009 | |
| TW | I345585 | | 7/2011 | |

* cited by examiner

PIXEL STRUCTURE AND ARRAY SUBSTRATE

CROSS REFERENCE TO RELATED APPLICATIONS

This application is a divisional of application Ser. No. 13/794,828 filed Mar. 12, 2013, which is incorporated by reference herein in its entirety.

BACKGROUND OF THE INVENTION

1. Field of the Invention

The present invention relates to a pixel structure and an array substrate, and more particularly, a multi-domain pixel structure and an array substrate.

2. Description of the Prior Art

With the advantages of light weight and small size, liquid crystal display panels have been widely used in all kinds of electronic products, for example, a mobile phone, a personal digital assistant (PDA), and a notebook. As the technology of large-size liquid crystal display panels has evolved rapidly, the liquid crystal display panels now occupy the greatest proportion of the entire display market. However, the viewing angle of the liquid crystal display panels is limited and hinders the technical evolution of the liquid crystal display panels. A traditional in-plane switching liquid crystal display panel is thus developed.

In the traditional in-plane switching liquid crystal display panel, there is only one alignment direction in a single sub pixel because the alignment direction is formed by a rubbing method. However, because the liquid crystal molecules have both long axes and short axes, leading to the birefringence, the phase difference varies according to different viewing angles. And this is why color changes in the image displayed by the traditional in-plane switching liquid crystal display panel from different viewing angles. In other words, bluish color happens when a viewer sees the liquid crystal display panel along the long axis, and yellowish color happens when the viewer sees the liquid crystal display panel along the short axis. To avoid color wash-out, the pixel electrode in a single sub pixel is recently designed as a specific form and thus the liquid crystal molecules in different sections of the sub pixel rotate in the different directions when a voltage is applied to the pixel electrode of the liquid crystal display panel. Nevertheless, color wash-out remains; especially, the lower Gamma value, the more severe color wash-out.

Accordingly, reducing color wash-out in the liquid crystal display panel is a main objective in the field.

SUMMARY OF THE INVENTION

It is one of the objectives of the present invention to provide a pixel structure and an array substrate, thereby minimizing color wash-out.

To achieve the purposes described above, an embodiment of the present invention provides a pixel structure, disposed on the substrate. The pixel structure includes an alignment layer, a common electrode, a pixel electrode, and a thin film transistor layer. The alignment layer is disposed on the substrate, and the alignment layer has a first section and a second section. The first section has a first alignment direction, and the second section has a second alignment direction perpendicular to the first alignment direction. The common electrode is disposed between the substrate and the alignment layer. The pixel electrode is disposed between the substrate and the alignment layer. The thin film transistor layer is disposed between the substrate and the pixel electrode.

To achieve the purposes described above, another embodiment of the present invention further provides a pixel structure, disposed on the substrate. The pixel structure includes an alignment layer, a common electrode, a pixel electrode, and a thin film transistor layer. The alignment layer is disposed on the substrate. The common electrode is disposed between the substrate and the alignment layer. The pixel electrode is disposed between the substrate and the alignment layer. The pixel electrode includes a plurality of first stripe slits parallel to each other and a plurality of second stripe slits parallel to each other. The first stripe slits are perpendicular to the second stripe slits. The thin film transistor layer is disposed between the substrate and the pixel electrode.

To achieve the purposes described above, an embodiment of the present invention further provides an array substrate. The array substrate includes a substrate and a plurality of pixel structures. The substrate has a plurality of pixel regions, and each of the pixel structures is disposed on each of the pixel regions of the substrate. The pixel structure includes an alignment layer, a common electrode, a pixel electrode, and a thin film transistor layer. The alignment layer is disposed on the substrate, and the alignment layer has a first section and a second section. The first section has a first alignment direction, and the second section has a second alignment direction perpendicular to the first alignment direction. The common electrode is disposed between the substrate and the alignment layer. The pixel electrode is disposed between the substrate and the alignment layer. The pixel electrode includes a plurality of first stripe slits parallel to each other and a plurality of second stripe slits parallel to each other. The first stripe slits overlap the first section. The second stripe slits overlap the second section. The first stripe slits are perpendicular to the second stripe slits. The thin film transistor layer is disposed between the substrate and the pixel electrode.

To sum up, in the present invention, the first alignment direction and the second alignment direction perpendicular to the first alignment direction are formed in the alignment layer of one single pixel structure. Moreover, with the pixel electrode having the first stripe slits and the second stripe slits perpendicular to the first stripe slits, the long axes of the liquid crystal molecules on the first section with the first alignment direction and the long axes of the liquid crystal molecules on the second section with the second alignment direction are perpendicular to each other, no matter what the gray level value displayed by the pixel structure is. Accordingly, the viewer may see a uniform distribution of phase difference at different viewing angles when viewing the pixel structure; therefore, the pixel structure prevent the viewer from seeing more of the long axis components of the liquid crystal molecules or more of the short axis components of the liquid crystal molecules, and reduce the tendency for color wash-out effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
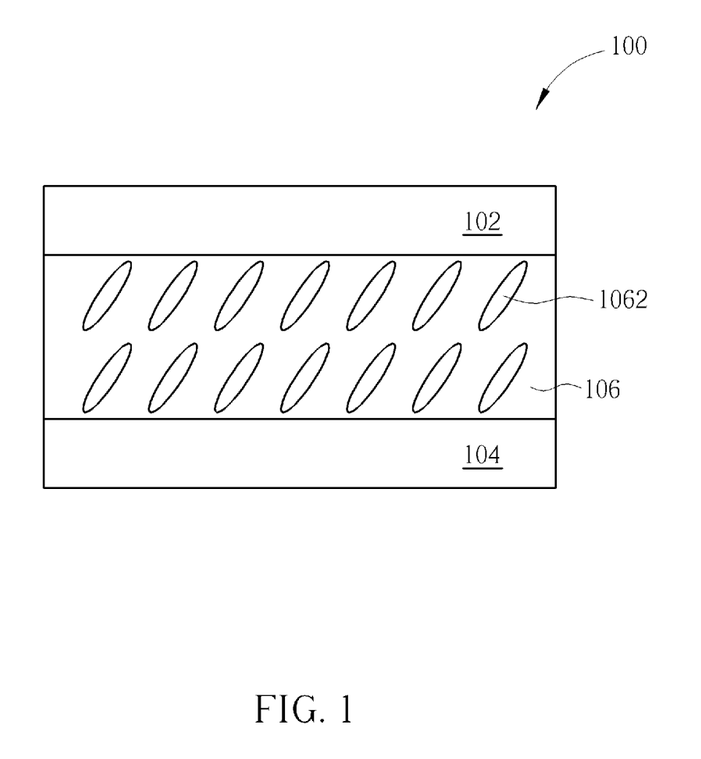
FIG. 1 is a cross-sectional view schematic diagram illustrating a liquid crystal display panel according to the present invention.
Figure 2:
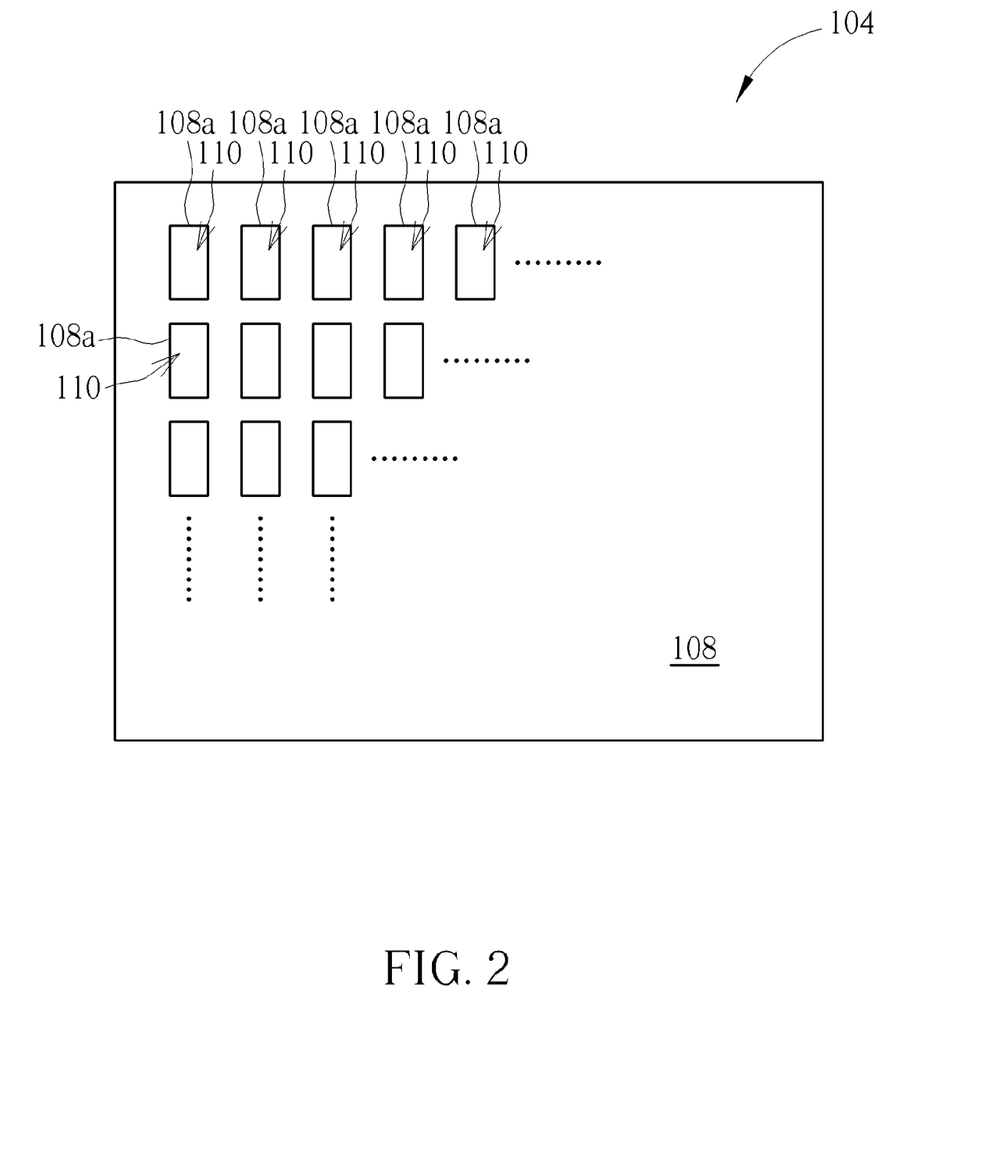
FIG. 2 is a top-view schematic diagram illustrating an array substrate according to an embodiment of the present invention.

Please refer to FIGS. 1-2. FIG. 1 is a cross-sectional view schematic diagram illustrating a liquid crystal display panel according to the present invention. FIG. 2 is a top-view schematic diagram illustrating an array substrate according to an embodiment of the present invention. As shown in FIG. 1, a liquid crystal display panel 100 includes a color filter substrate 102, an array substrate 104, and a liquid crystal layer 106. The color filter substrate 102 is disposed oppositely to the array substrate 104. The liquid crystal layer 106 is disposed between the color filter substrate 102 and the array substrate 104. The liquid crystal layer 106 includes a plurality of liquid crystal molecules 1062, for example, positive type liquid crystal or negative type liquid crystal. As shown in FIG. 2, the array substrate 104 includes a substrate 108 and a plurality of pixel structures 110. The substrate 108 has a plurality of pixel regions 108a, and each of the pixel structures 110 is disposed on the substrate 108 in each of the pixel regions 108a. In this embodiment, each of the pixel regions 108a corresponds to a single color of each pixel of a frame displayed by the liquid crystal display panel 100, respectively; in other words, each of the pixel regions 108a corresponds to each sub pixel of a frame. The substrate 108 may include a transparent substrate, such as a glass substrate, a quartz substrate, or a plastic substrate.

Figure 3:
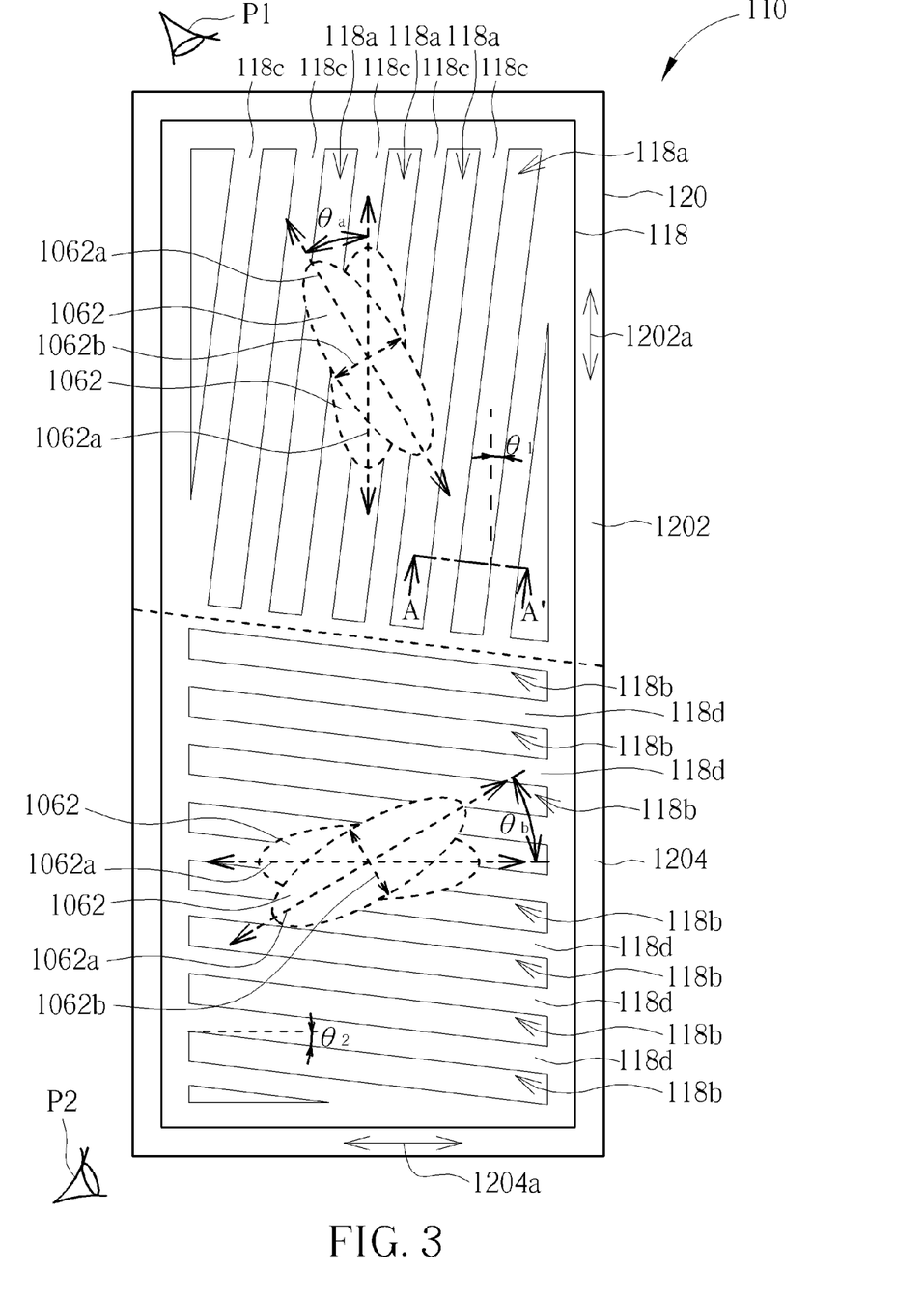
FIG. 3 is a top-view schematic diagram illustrating a pixel structure according to a first embodiment of the present invention.
Figure 4:
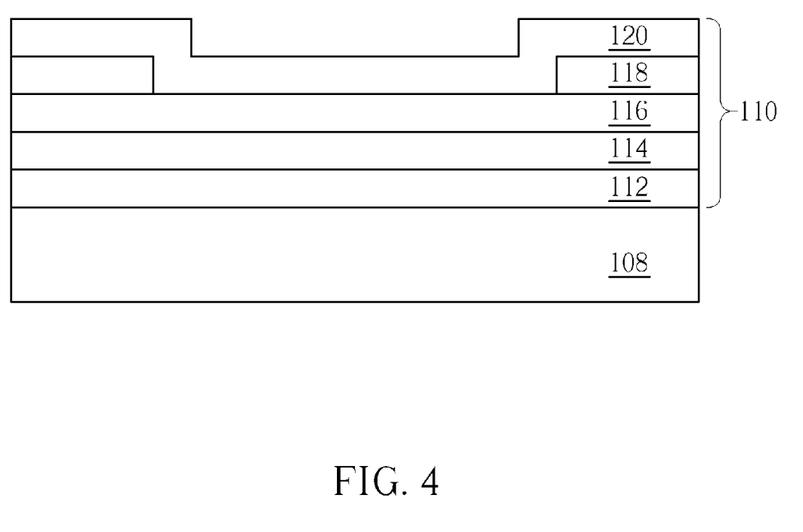
FIG. 4 is a cross-sectional view schematic diagram taken along a cross-sectional line A-A' in FIG. 3.

The following description further illustrates the pixel structure of each pixel region in this embodiment, and only the pixel structure of a single pixel region is taken as an example. Please refer to FIGS. 3-4. FIG. 3 is a top-view schematic diagram illustrating a pixel structure according to a first embodiment of the present invention. FIG. 4 is a cross-sectional view taken along a cross-sectional line A-A' in FIG. 3. As shown in FIG. 3 and FIG. 4, the pixel structure 110 includes a thin film transistor layer 112, a common electrode 114, an isolating layer 116, a pixel electrode 118, and an alignment layer 120. The alignment layer 120 is disposed on the substrate 108, and the alignment layer 120 has a first section 1202 and a second section 1204. The first section 1202 has a first alignment direction 1202a, and the second section 1204 has a second alignment direction 1204a perpendicular to the first alignment direction 1202a. Accordingly, the long axes 1062a of the liquid crystal molecules 1062 disposed on the first section 1202 is disposed along the first alignment direction 1202a, and the long axes 1062a of the liquid crystal molecules 1062 disposed on the second section 1204 is disposed along the second alignment direction 1204a.

In this embodiment, the alignment layer 120 includes a photoreactive polymide. The reaction mechanism of the photoreactive polymide may be photo-crosslinking, photo-isomerization, photo-degradation, photo-realignment, but not limited thereto. When the photoreactive polymide is irradiated with ultraviolet light with linear polarization, the photoreactive polymide reacts with the ultraviolet light in the direction parallel to the polarization direction of the ultraviolet light so as to orient the alignment direction of the alignment layer 120 parallel to or perpendicular to the polarization direction of the ultraviolet light. In this embodiment, the alignment layer 120 with the first alignment direction 1202a and the second alignment direction 1204a perpendicular to each other may be formed by emitting the ultraviolet light to a polarizer with mutually perpendicular polarization direction in the same pixel region 108a, such as patterned wire grid polarizer (patterned WGP), and irradiating the photoreactive polymide with the ultraviolet light penetrating the polarizer. The method to form the alignment layer 120 of the present invention is not limited to the method mentioned above.

The common electrode 114 is disposed between the substrate 108 and the alignment layer 120. The pixel electrode 118 is disposed between the substrate 108 and the alignment layer 120. The thin film transistor layer 112 is disposed between the substrate 108 and the alignment layer 120. The thin film transistor layer 112 includes a thin film transistor (not shown), data lines (not shown), and scan lines (not shown). The thin film transistor, the data lines and the scan lines are used to electrically connect the pixel electrode 118 and the common electrode 114 to a control unit. In this embodiment, the isolating layer 116 is disposed between the common electrode 114 and the pixel electrode 118, and is used to electrically isolate the common electrode 114 from the pixel electrode 118. The common electrode 114 is disposed between the isolating layer 116 and the thin film transistor layer 112. The pixel electrode 118 is disposed between the alignment layer 120 and the isolating layer 116. Therefore, the pixel structure 110 in this embodiment is a pixel structure of a fringe field switching liquid crystal display panel 100.

The pixel electrode 118 includes a plurality of first stripe slits 118a parallel to each other and a plurality of second stripe slits 118b parallel to each other. The first stripe slits 118a overlap the first section 1202. The second stripe slits 118b overlap the second section 1204. The first stripe slits 118a are perpendicular to the second stripe slits 118b. In other words, the pixel electrode 118 includes a plurality of first stripe portions 118c and a plurality of second stripe portions 118d. The first stripe portions 118c are perpendicular to the second stripe portions 118d. There is one of the first stripe slits 118a between any two of the first stripe portions 118c adjacent to each other. There is one of the second stripe slit 118b between any two of the second stripe portions 118d adjacent to each other. The first stripe portions 118c overlap the first section 1202. The second stripe portions 118d overlap the second section 1204. There is a first included angle θ1 between the extension direction of each of the first stripe slits 118a and the first alignment direction 1202a, and the first included angle θ1 is greater than zero degrees, and less than or equal to 20 degrees. There is a second included angle θ2 between the extension direction of each of the second stripe slits 118b and the second alignment direction 1204a, and the second included angle θ2 is greater than zero degrees, and less than or equal to 20 degrees. Accordingly, the pixel structure 110 in this embodiment is a two-domain pixel structure. In other embodiments of the present invention, the common electrode 114 and the isolating layer 116 may be disposed in the thin film transistor layer 112, or only the common electrode 114 is disposed in the thin film transistor layer 112.

It is worth noting that, when no voltage difference is applied between the pixel electrode 118 and the common electrode 114, the pixel structure 110 is in an off state. The long axes 1062a of the liquid crystal molecules 1062 disposed on the first section 1202 are disposed along the first alignment direction 1202a. The long axes 1062a of the liquid crystal molecules 1062 disposed on the second section 1204 are disposed along the second alignment direction 1204a. As a voltage difference is applied between the pixel electrode 118 and the common electrode 114 according to a gray level value in the pixel structure 110, the pixel structure 110 is in an on state and an electric field is generated between the pixel electrode 118 and the common electrode 114. At the same time, the liquid crystal molecules 1062 on the first section 1202 will be driven by the electric field and is rotated by a first angle θa toward a direction parallel to the electric field in the counter-clockwise direction, that is, the liquid crystal molecules 1062 on the first section 1202 is rotated toward a direction perpendicular to the first stripe slits 118a. The liquid crystal molecules 1062 on the second section 1204 will be driven by the electric field and is rotated by a second angle θb toward the direction parallel to the electric field. Because the first stripe slits 118a and the second stripe slits 118b are perpendicular to each other, the electric field applied to the liquid crystal molecules 1062 on the first section 1202 and the electric field applied to the liquid crystal molecules 1062 on the second section 1204 are the same, and the first angle θa is the same as the second angle θb. The magnitude of the electric field depends on the magnitude of the gray level value; therefore, the first angle θa and the second angle θb are changed with different gray level values but kept the same as each other. Whatever the gray level value displayed by the sub pixel is, the liquid crystal molecules 1062 disposed on the first section 1202 and the liquid crystal molecules 1062 disposed on the second section 1204 are still perpendicular to each other because of the same rotation angle when the pixel structure 100 is in the on state. When a viewer views the pixel structure 110 in a first position P1, the viewer may view both the long axes 1062a of the liquid crystal molecules 1062 on the first sections 1202 and the short axes 1062b of the liquid crystal molecules 1062 on the second sections 1204. When a viewer views the pixel structure 110 on a second position P2, the viewer may view both the short axes 1062b of the liquid crystal molecules 1062 on the first sections 1202 and the long axes 1062a of the liquid crystal molecules 1062 on the second sections 1204. Therefore, the viewer may see a uniform distribution of phase difference at different viewing angles when viewing the pixel structure 110. Therefore, the pixel structure 110 in this embodiment prevent the viewer from seeing more of the long axis 1062a components of the liquid crystal molecules 1062 or more of the short axis 1062b components of the liquid crystal molecules 1062, and thus reduce color wash-out effectively.

Pixel structures are not restricted to the preceding embodiments in the present invention. Other embodiments or modifications will be detailed in the following description. In order to simplify and show the difference between the other embodiments or modifications and the above-mentioned embodiment, the same numerals denote the same components in the following description, and the same parts are not detailed redundantly.

Figure 5:
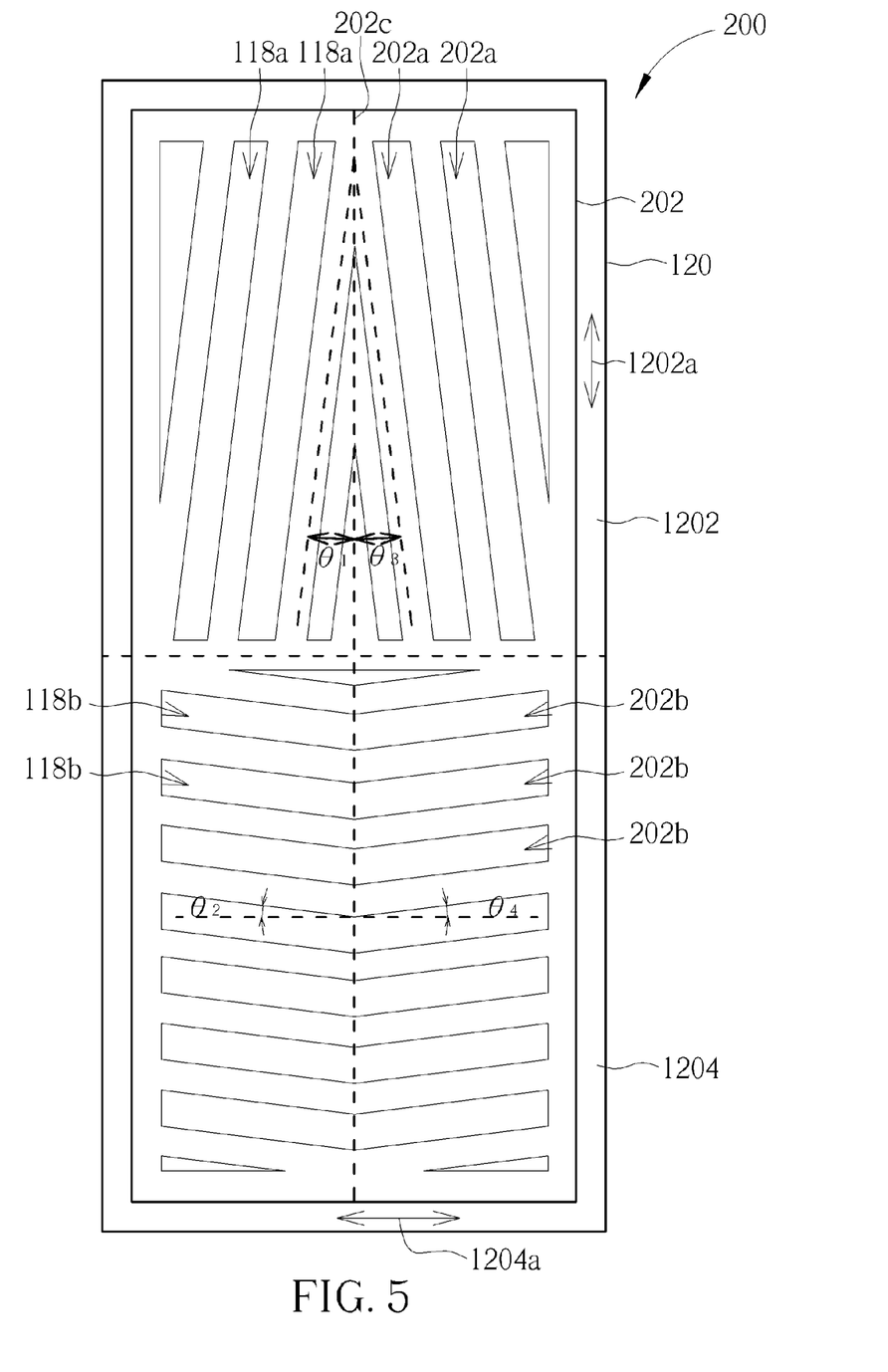
FIG. 5 is a top-view schematic diagram illustrating a pixel structure according to a second embodiment of the present invention.

Please refer to FIG. 5. FIG. 5 is a top-view schematic diagram illustrating a pixel structure according to a second embodiment of the present invention. As shown in FIG. 5, as compared with the first embodiment, the pixel electrode 202 of the pixel structure 200 in this embodiment further includes a plurality of third stripe slits 202a parallel to each other and a plurality of fourth stripe slits 202b parallel to each other. The third stripe slits 202a overlap the first section 1202. The fourth stripe slits 202b overlap the second section 1204. The third stripe slits 202a are perpendicular to the fourth stripe slits 202b. The pixel electrode 202 has a centerline 202c parallel to the first alignment direction 1202a, and the first stripe slits 118a and the third stripe slits 202a are symmetric with respect to the centerline 202c. There is a third included angle θ3 between the each of third stripe slits 202a and the first alignment direction 1202a, and the third included angle θ3 is greater than zero degrees, and less than or equal to 20 degrees. The included angle between each of the third stripe slits 202a and each of the first stripe slits 118a is twice of the third included angle θ3 between each of the third stripe slits 202a and the first alignment direction 1202a. Moreover, the second stripe slits 118b and the fourth stripe slits 202b are symmetric with respect to the centerline 202c. There is a fourth included angle θ4 between each of the fourth stripe slits 202b and the second alignment direction 1204a, and the fourth included angle θ4 is greater than zero degrees, and less than or equal to 20 degrees. Each of the second stripe slits 118b connects each of the fourth stripe slits 202b, respectively, to form a V-shaped slit. The V-shaped slits are arranged sequentially along the centerline 202c. Accordingly, the pixel structure 200 in this embodiment is a four-domain pixel structure.

Figure 6:
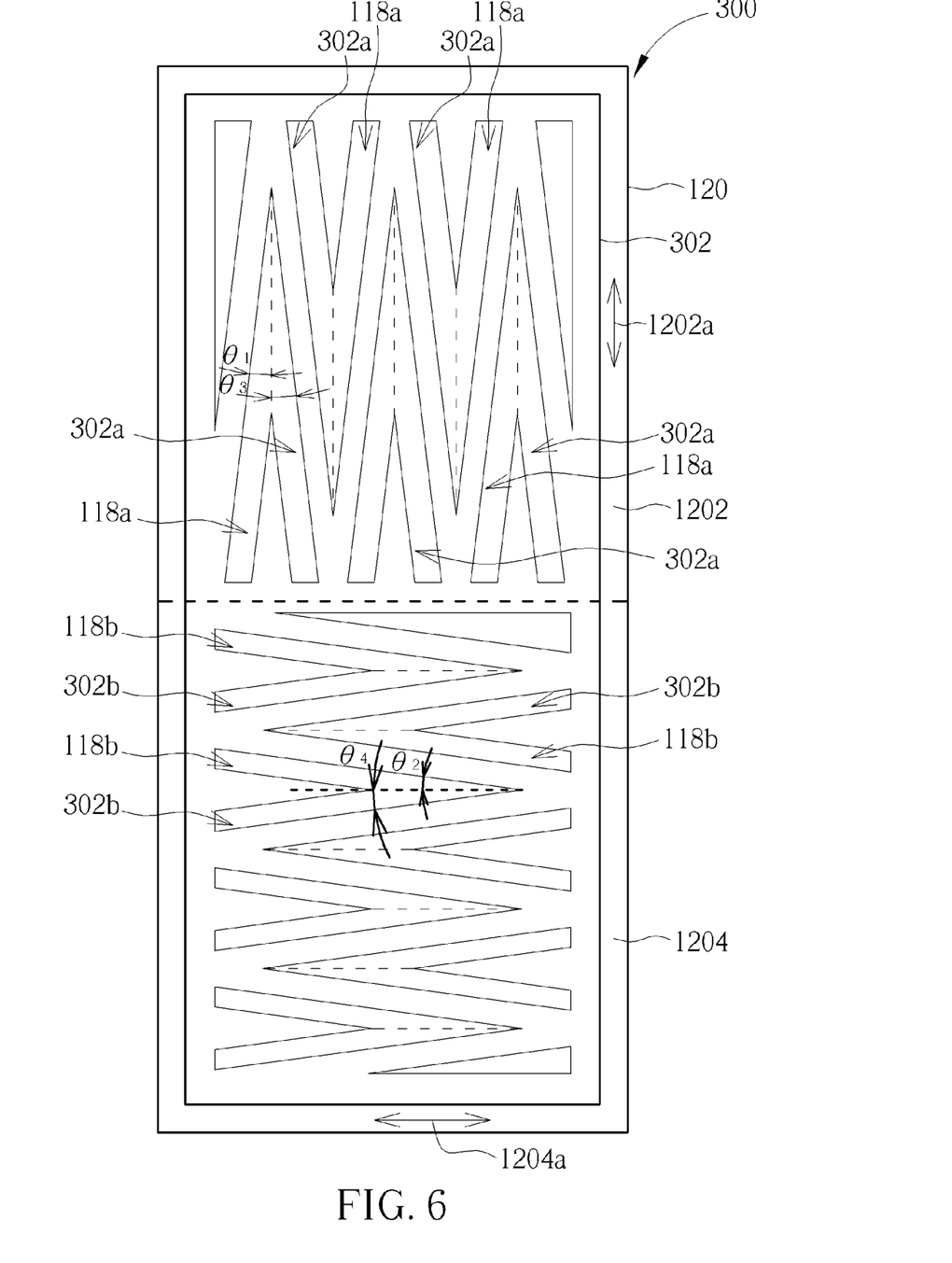
FIG. 6 is a top-view schematic diagram illustrating a pixel structure according to a third embodiment of the present invention.

Please refer to FIG. 6. FIG. 6 is a top-view schematic diagram illustrating a pixel structure according to a third embodiment of the present invention. As shown in FIG. 6, as compared with the first embodiment, the pixel electrode 302 of the pixel structure 300 in this embodiment further includes a plurality of third stripe slits 302a parallel to each other and a plurality of fourth stripe slits 302b parallel to each other. The third stripe slits 302a overlap the first section 1202. The fourth stripe slits 302b overlap the second section 1204. The third stripe slits 302a are perpendicular to the fourth stripe slits 302b. Each of the third stripe slits 302a connects each of the first stripe slits 118a, respectively, and each of the third stripe slits 302a and each of the first stripe slits 118a are symmetric with respect to the first alignment direction 1202a, respectively, to form a V-shaped slit. There is a third included angle θ3 between each of the third stripe slits 302a and the first alignment direction 1202a, and the third included angle θ3 is greater than zero degrees, and less than or equal to 20 degrees. The included angle between each of the third stripe slits 302a and each of the first stripe slits 118a is twice of the third included angle θ3 between each of the third stripe slits 302a and the first alignment direction 1202a. Each of the second stripe slits 118b connects each of the fourth stripe slits 302b, respectively, and each of the second stripe slits 118b and each of the fourth stripe slits 302b are symmetric with respect to the second alignment direction 1204a, respectively, to form a V-shaped slit. There is a fourth included angle θ4 between each of the fourth stripe slits 302b and the second alignment direction 1204a, and the fourth included angle θ4 is greater than zero degrees, and less than or equal to 20 degrees. The included angle between each of the fourth stripe slits 302b and each of the second stripe slits 118b is twice of the fourth included angle θ4 between each of the fourth stripe slits 302b and the second alignment direction 1204a. Accordingly, the pixel structure 300 in this embodiment is a multi-domain pixel structure.

Figure 7:
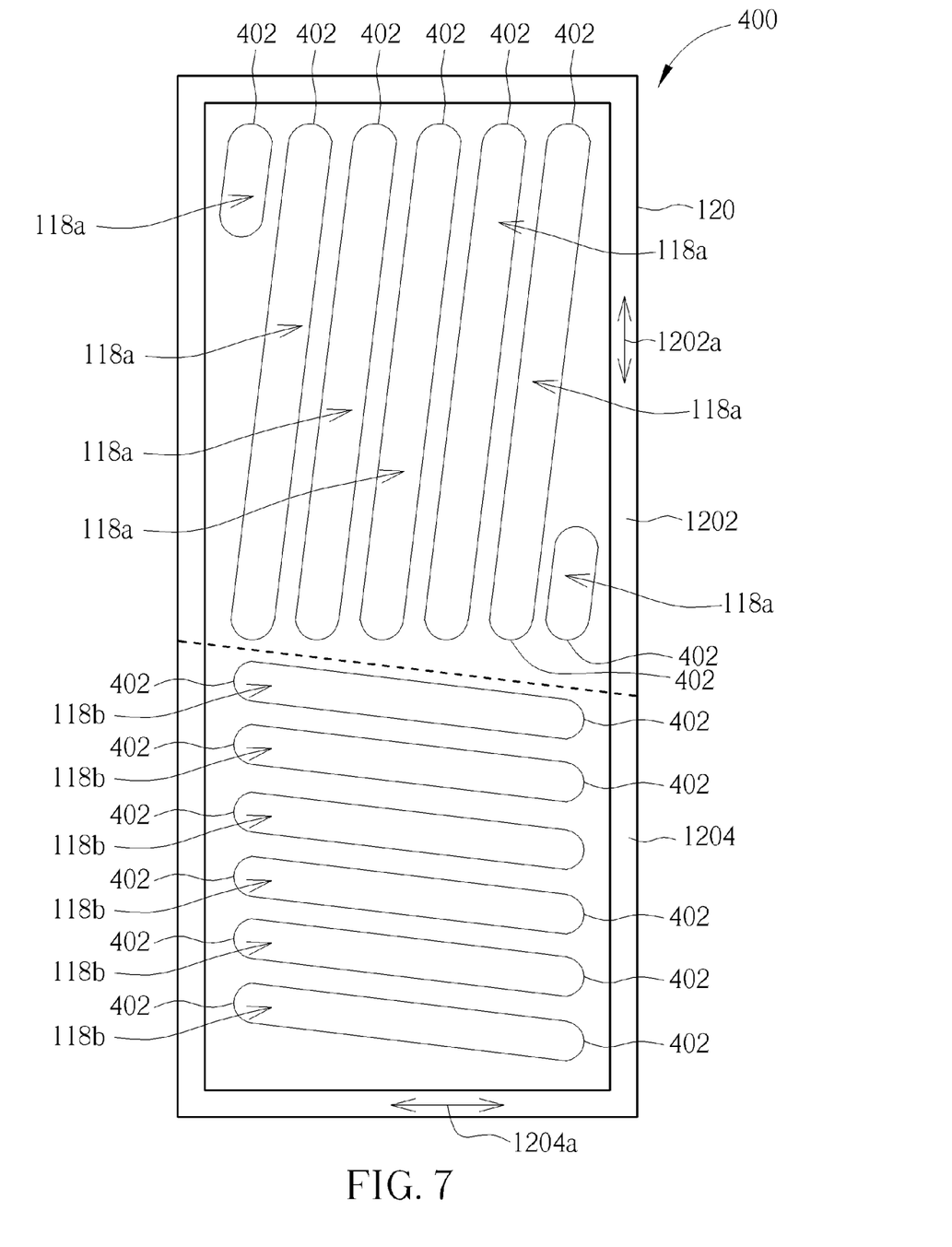
FIG. 7 is a top-view schematic diagram illustrating a pixel structure according to a fourth embodiment of the present invention.

Please refer to FIG. 7. FIG. 7 is a top-view schematic diagram illustrating a pixel structure according to a fourth embodiment of the present invention. As shown in FIG. 7, as compared with the first embodiment, each of the first stripe slits 118a of the pixel structure 400 in this embodiment has a micro-structure 402 at both ends, respectively. Each of the second stripe slits 118b of the pixel structure 400 in this embodiment has a micro-structure 402 at both ends, respectively. The micro-structures 402 may reduce dark fringes created by the tip structure at the two ends of the first stripe slits 118a and the two ends of the second stripe slits 118b. Each of the micro-structures 402 includes an arc-shaped slit. In other embodiments of the present invention, each of the micro-structures 402 may further include a plurality of jagged fine slits or other geometric patterns.

Figure 8:
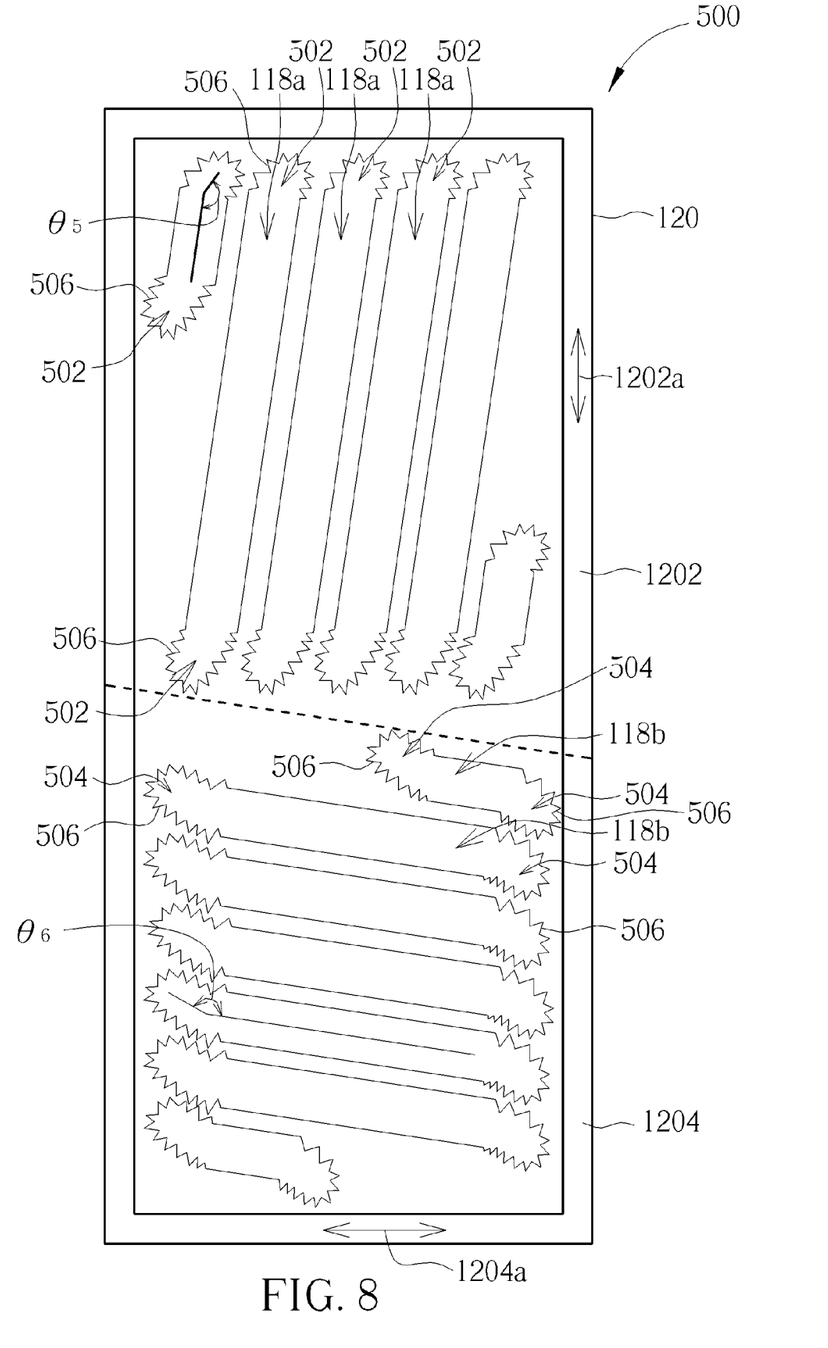
FIG. 8 is a top-view schematic diagram illustrating a pixel structure according to a fifth embodiment of the present invention.

Please refer to FIG. 8. FIG. 8 is a top-view schematic diagram illustrating a pixel structure according to a fifth embodiment of the present invention. As shown in FIG. 8, as compared with the first embodiment, each of the first stripe slits 118a of the pixel structure 500 in this embodiment has a first branch slit 502 at both ends, respectively; each of the second stripe slits 118b of the pixel structure 500 in this embodiment has a second branch slit 504 at both ends, respectively. The first branch slit 502 and the second branch slit 504 can be configured to reduce the dark fringes at the edge. In other words, the first branch slits 502 are extended from each of the first stripe slits 118a, respectively; the second branch slits 504 are extended from each of the second stripe slits 118b, respectively. The first branch slits 502 are parallel to each other, but the first branch slits 502 are not parallel to the first stripe slits 118a. There is a fifth included angle θ5 between each of the first stripe slits 118a and each of the first branch slits 502, and the fifth included angle θ5 is less than 180 degrees. The second branch slits 504 are parallel to each other, but the second branch slits 504 are not parallel to the second stripe slits 118b. There is a sixth included angle θ6 between each of the second stripe slits 118b and each of the second branch slits 504, and the sixth included angle θ6 is less than 180 degrees. Moreover, the first branch slits 502 are perpendicular to the second branch slits 504. In this embodiment, each of the first branch slits 502 has a micro-structure 506, respectively; each of the second branch slits 504 has a micro-structure 506, respectively. Each of the micro-structures 506 includes a plurality of jagged fine slits. In other embodiments of the present invention, each of the micro-structures 506 further includes arc-shaped slits or other geometric patterns.

Figure 9:
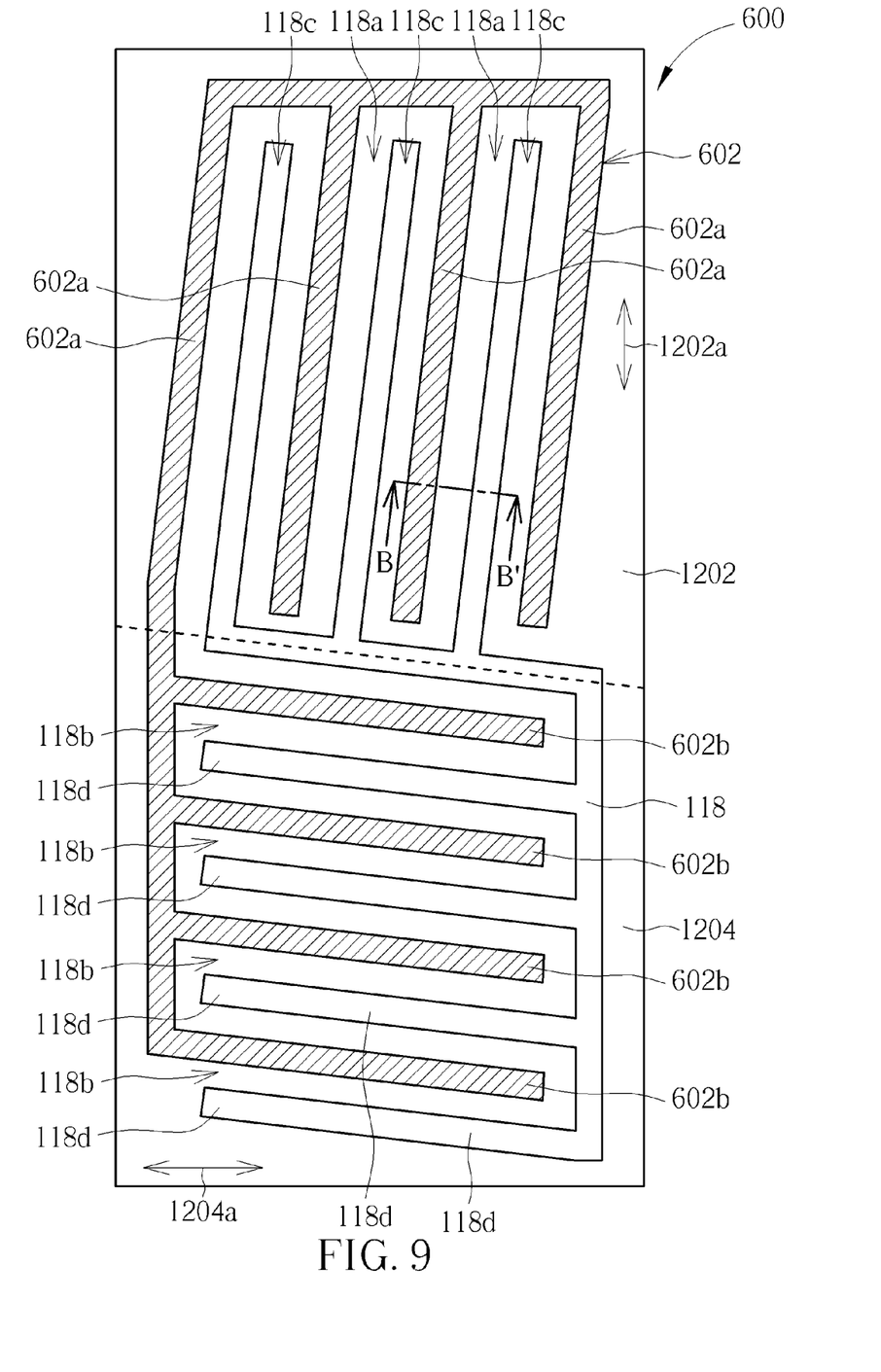
FIG. 9 is a top-view schematic diagram illustrating a pixel structure according to a sixth embodiment of the present invention.
Figure 10:
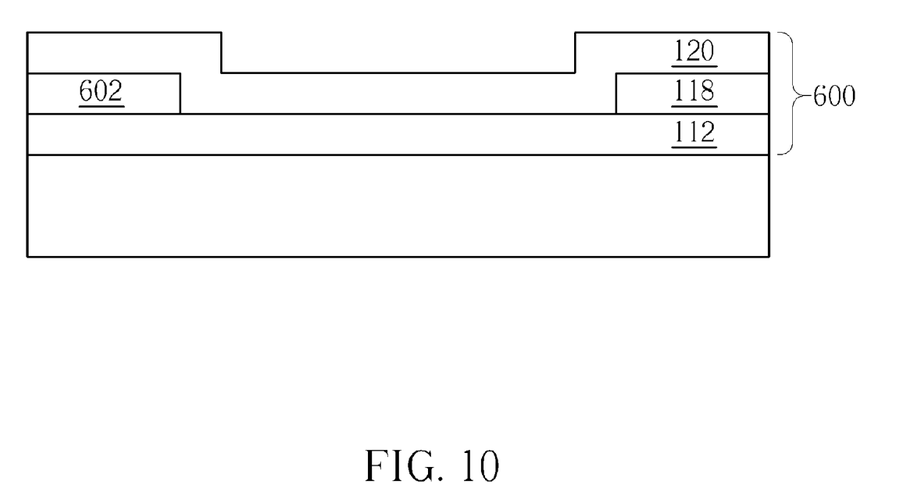
FIG. 10 is a cross-sectional view schematic diagram taken along a cross-sectional line B-B' in FIG. 9.

Please refer to FIG. 9 and FIG. 10. FIG. 9 is a top-view schematic diagram illustrating a pixel structure according to a sixth embodiment of the present invention. FIG. 10 is a cross-sectional view taken along a cross-sectional line B-B' in FIG. 9. As shown in FIG. 9 and FIG. 10, as compared with the first embodiment, the common electrode 602 and the pixel electrode 118 of the pixel structure 600 in this embodiment may be formed by patterning the same conductive layer; in other words, the common electrode 602 and the pixel electrode 118 are made of the same conductive material, and the common electrode 602 and the pixel electrode 118 are disposed between the alignment layer 120 and the thin film transistor layer 112. Moreover, the pixel structure 600 in this embodiment does not include the isolating layer. Accordingly, the pixel structure 600 in this embodiment is a pixel structure of an in-plane switching liquid crystal display panel. Moreover, in order to dispose the common electrode 602 and the pixel electrode 118 between the alignment layer 120 and the thin film transistor layer 112 simultaneously, the common electrode 602 in this embodiment further includes a plurality of first common electrode stripe portions 602a parallel to each other and a plurality of second common electrode stripe portions 602b parallel to each other. The first common electrode stripe portions 602a overlap the first section 1202. The second common electrode stripe portions 602b overlap the second section 1204. Each of the first stripe slits 118a and each of the second stripe slits 118b have an opening respectively. Each of the first common electrode stripe portions 602a of the common electrode 602 extends into each of the first stripe slits 118a, respectively. Each of the first common electrode stripe portions 602a is parallel to each of the first stripe portions 118c. Each of the first common electrode stripe portions 602a and each of the first stripe portions 118c are alternately arranged along the direction perpendicular to the extending direction of the first stripe slits 118a. Each of the second common electrode stripe portions 602b of the common electrode 602 extends into each of the second stripe slits 118b, respectively. Each of the second common electrode stripe portions 602b is parallel to each of the second stripe portions 118d. Each of the second common electrode stripe portions 602b and each of the second stripe portions 118d are alternately arranged along the direction perpendicular to the extending direction of the second stripe slits 118b in sequence.

Figure 11:
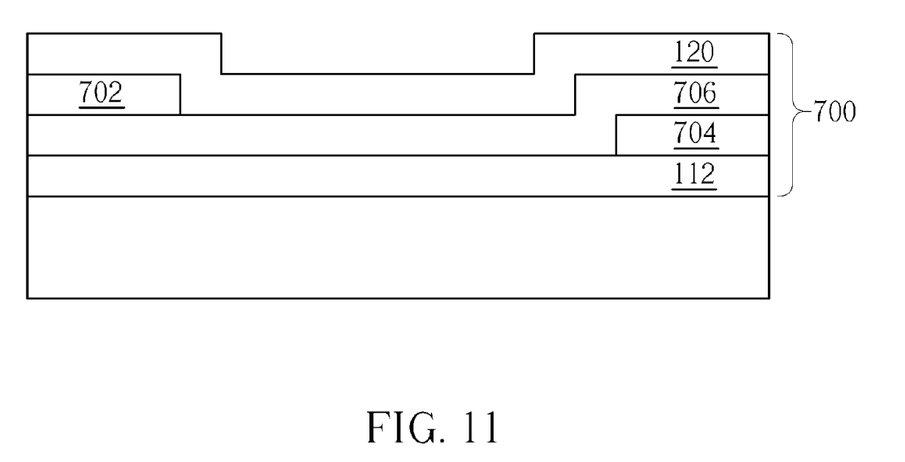
FIG. 11 is a cross-sectional view schematic diagram illustrating a pixel structure according to a seventh embodiment of the present invention.

Please refer to FIG. 11. FIG. 11 is a cross-sectional view schematic diagram illustrating a pixel structure according to a seventh embodiment of the present invention. As shown in FIG. 11, as compared with the sixth embodiment, the common electrode 702 and the pixel electrode 704 of the pixel structure 700 in this embodiment may be formed by patterning different conductive layers. The pixel structure 700 further includes an isolating layer 706, which is disposed between the common electrode 702 and the pixel electrode 704. The common electrode 702 is disposed between the isolating layer 706 and the alignment layer 120, and the pixel electrode 704 is disposed between the isolating layer 706 and the thin film transistor layer 112.

To sum up, in the present invention, the first alignment direction and the second alignment direction perpendicular to the first alignment direction are formed in the alignment layer of one single pixel structure. Moreover, with the pixel electrodes having the first stripe slits and the second stripe slits perpendicular to the first stripe slits, the long axes of the liquid crystal molecules on the first section with the first alignment direction and the long axes of the liquid crystal molecules on the second section with the second alignment direction are perpendicular to each other, no matter what the gray level value displayed by the pixel structure is. Accordingly, the viewer may see a uniform distribution of phase difference at different viewing angles when viewing the pixel structure; therefore, the pixel structure prevent the viewer from seeing more of the long axis components of the liquid crystal molecules or more of the short axis components of the liquid crystal molecules, and reduce the tendency for color wash-out effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel structure, disposed on a substrate, and the pixel structure comprising:
    an alignment layer, disposed on the substrate, and the alignment layer comprising a first section and a second section, wherein the first section has a first alignment direction, and the second section has a second alignment direction perpendicular to the first alignment direction;
    a common electrode, disposed between the substrate and the alignment layer; and
    a pixel electrode, disposed between the substrate and the alignment layer, wherein the pixel electrode comprises a plurality of first stripe slits parallel to each other, a plurality of second stripe slits parallel to each other, a plurality of third stripe slits parallel to each other, and a plurality of fourth stripe slits parallel to each other, the first stripe slits and the third stripe slits overlap the first section, the second stripe slits and the fourth stripe slits overlap the second section, the first stripe slits are perpendicular to the second stripe slits, and the third stripe slits are perpendicular to the fourth stripe slits, and wherein each of the first stripe slits connects each of the third stripe slits, each of the first stripe slits and each of the third stripe slits are symmetric with respect to the first alignment direction to form a first V-shaped slit, the first V-shaped slits are divided into a plurality of first V-shaped sub-slits and a plurality of second V-shaped sub-slits, each of the first V-shaped sub-slits has a first opening, each of the second V-shaped sub-slits has a second opening, each of the first openings and each of the second openings face two opposite directions respectively, each of the first V-shaped sub-slits and each of the second V-shaped sub-slits are alternately arranged along the second alignment direction, each of the second stripe slits connects each of the fourth stripe slits, and each of the second stripe slits and each of the fourth stripe slits are symmetric with respect to the second alignment direction to form a second V-shaped slit.

2. The pixel structure according to claim 1, wherein an included angle between each of the first stripe slits and the first alignment direction is greater than zero degrees, and less than or equal to 20 degrees.

3. The pixel structure according to claim 1, further comprising an isolating layer, disposed between the common electrode and the pixel electrode.

4. The pixel structure according to claim 3, wherein the pixel electrode is disposed between the isolating layer and the alignment layer, and the common electrode is disposed between the isolating layer and the substrate.

5. The pixel structure according to claim 3, wherein the common electrode is disposed between the isolating layer and the alignment layer, and the pixel electrode is disposed between the isolating layer and the substrate.

6. The pixel structure according to claim 1, wherein the second V-shaped slits are divided into a plurality of third V-shaped sub-slits and a plurality of fourth V-shaped sub-slits, each of the third V-shaped sub-slits has a third opening, each of the fourth V-shaped sub-slits has a fourth opening, each of the third openings and each of the fourth openings respectively face another two opposite directions different from the two opposite directions, each of the third V-shaped sub-slits and each of the fourth V-shaped sub-slits are alternately arranged along the first alignment direction.

7. An array substrate, comprising:
    a substrate, having a plurality of pixel regions; and
    a plurality of pixel structures, disposed on the substrate in the pixel regions respectively, and each of the pixel structure comprising:
        an alignment layer, disposed on the substrate, and the alignment layer comprising a first section and a second section, wherein the first section has a first alignment direction, and the second section has a second alignment direction perpendicular to the first alignment direction;
        a common electrode, disposed between the substrate and the alignment layer; and
        a pixel electrode, disposed between the substrate and the alignment layer, wherein the pixel electrode comprises a plurality of first stripe slits parallel to each other, a plurality of second stripe slits parallel to each other, a plurality of third stripe slits parallel to each other, and a plurality of fourth stripe slits parallel to each other, the first stripe slits and the third stripe slits overlap the first section, the second stripe slits and the fourth stripe slits overlap the second section, the first stripe slits are perpendicular to the second stripe slits, and the third stripe slits are perpendicular to the fourth stripe slits, and wherein each of the first stripe slits connects each of the third stripe slits, each of the first stripe slits and each of the third stripe slits are symmetric with respect to the first alignment direction to form a first V-shaped slit, the first V-shaped slits are divided into a plurality of first V-shaped sub-slits and a plurality of second V-shaped sub-slits, each of the first V-shaped sub-slits has a first opening, each of the second V-shaped sub-slits has a second opening, each of the first openings and each of the second openings face two opposite directions respectively, each of the first V-shaped sub-slits and each of the second V-shaped sub-slits are alternately arranged along the second alignment direction, each of the second stripe slits connects each of the fourth stripe slits, and each of the second stripe slits and each of the fourth stripe slits are symmetric with respect to the second alignment direction to form a second V-shaped slit.

8. The array substrate according to claim 7, wherein the second V-shaped slits are divided into a plurality of third V-shaped sub-slits and a plurality of fourth V-shaped sub-slits, each of the third V-shaped sub-slits has a third opening, each of the fourth V-shaped sub-slits has a fourth opening, each of the third openings and each of the fourth openings respectively face another two opposite directions different from the two opposite directions, each of the third V-shaped sub-slits and each of the fourth V-shaped sub-slits are alternately arranged along the first alignment direction.

* * * * *